United States Patent [19]

Kazuhito

[11] Patent Number: 5,033,593
[45] Date of Patent: Jul. 23, 1991

[54] SHOCK ABSORBING MEMBER FOR CAR BODY

[75] Inventor: Fukazawa Kazuhito, Yokohama, Japan

[73] Assignees: Mitsui & Co., Ltd., Tokyo; Kokan Kako Co., Ltd., Yokohama, both of Japan

[21] Appl. No.: 449,418

[22] Filed: Dec. 15, 1989

Related U.S. Application Data

[63] Continuation of Ser. No. 111,593, Oct. 23, 1987, abandoned.

[30] Foreign Application Priority Data

Oct. 27, 1986 [JP] Japan .............................. 61-253782

[51] Int. Cl.⁵ .............................................. F16F 7/12
[52] U.S. Cl. ..................................... 188/377; 52/795; 52/814; 293/133; 296/189; 428/119; 428/182
[58] Field of Search ....................... 188/371, 372, 377; 293/133; 296/188, 189; 428/119, 120, 182; 52/729, 795, 799, 814

[56] References Cited

U.S. PATENT DOCUMENTS

| | | | |
|---|---|---|---|
| 993,242 | 5/1911 | Grey | 52/729 |
| 2,056,563 | 10/1936 | Budd et al. | 52/729 X |
| 2,102,936 | 12/1937 | Bailey | 428/182 X |
| 2,125,690 | 8/1938 | Ragsdale et al. | 52/731 |
| 3,247,623 | 4/1966 | Anderson | 188/377 X |
| 3,252,548 | 5/1966 | Pajak et al. | 188/377 |
| 3,300,839 | 1/1967 | Lichti | 52/729 X |
| 3,614,848 | 10/1971 | Hitch | 428/120 X |
| 3,938,288 | 2/1976 | Roubinet . | |
| 4,029,350 | 6/1977 | Goupy et al. | 293/133 X |
| 4,084,029 | 4/1978 | Johnson et al. | 428/119 |
| 4,221,094 | 9/1980 | Murdock | 428/120 X |
| 4,227,593 | 10/1980 | Bricmont et al. | 188/377 |
| 4,319,471 | 3/1982 | Benteler et al. | 72/59 |
| 4,545,172 | 10/1985 | Wardill | 296/189 X |
| 4,702,515 | 10/1987 | Kato et al. | 296/189 |

FOREIGN PATENT DOCUMENTS

| | | | |
|---|---|---|---|
| 0057270 | 8/1982 | European Pat. Off. . | |
| 0063325 | 10/1982 | European Pat. Off. . | |
| 2258280 | 8/1975 | France . | |
| 357110 | 3/1930 | United Kingdom | 52/729 |
| 376127 | 7/1932 | United Kingdom | 52/795 |
| 539523 | 9/1941 | United Kingdom | 52/795 |

Primary Examiner—George E. A. Halvosa
Attorney, Agent, or Firm—Spencer & Frank

[57] ABSTRACT

This invention relates to a reinforcement member to be mounted internally in the doors of an automobile, and more particularly to the member comprising two parallel flat members and one or two corrugated members which connect said two parallel members in such a manner as to position the ridges of folds thereof perpendicular to the surfaces of the plate members. The reinforcement member is mounted internally in car doors. When the car receives an impact from the side of the door, the corrugated surfaces of the member can distribute the impact evenly by deforming themselves into a fan-like shape to thereby prevent the door from being abruptly folded at one point.

10 Claims, 4 Drawing Sheets

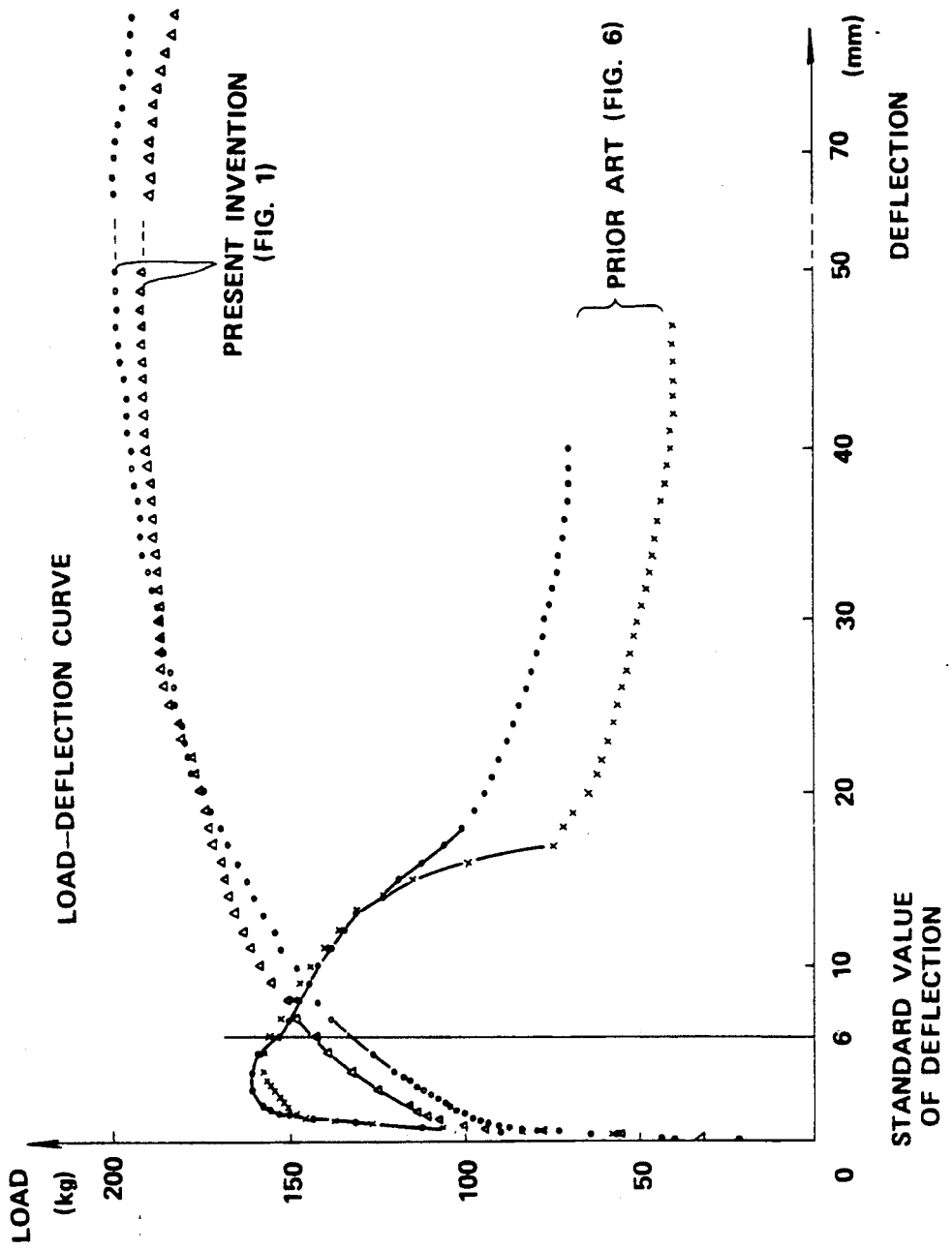

SHOCK ABSORBING MEMBER FOR CAR BODY

This application is a continuation of application Ser. No. 111,593, filed Oct. 23, 1987, abandoned.

BACKGROUND OF THE INVENTION

This invention relates to a structural member of an car body, and more particularly to a shock absorbing member which is mounted on the car door to absorb the impact of a collision, for protection the occupants of the car.

PRIOR ART

In a car body of a front engine type where the engine compartment provides sufficient space between the front end of the car body and the driver's seat, the shock is absorbed by the engine compartment even if the car comes into collision at the front. The driver is therefore protected to a certain extent from being subjected to a direct impact in a collision. When the car collides against something at the side, however, the occupants are subjected to a direct impact with a high probability as there is a door alone to protect the driver, and the door is often bent inside and injure the driver or passengers.

The door of a car is generally restricted in thickness in order to reserve as much space as possible inside the car, and also is restricted in the internal area as there should be installed a lock mechanism, the mechanism of raising/lowering the side window glass, a driving motor thereof, etc. As the size and weight of the member to reinforce the door should be made small in order to maximize the space and to minimize the weight of the car body, the door is heretofore left prone to impacts.

There have been proposed various structural materials for the reinforcement member of a car door which are small in volume and yet can withstand heavy loads.

FIGS. 5 and 6 show an example of such prior art members wherein shaped steel member B having flanges and two channeled portons A,A is welded at the locations marked with X to a plate member C having bent ends. Those prior art members are made of materials which are strong against a force in the direction marked with an arrow F as shown in FIG. 5 even if the cross section thereof is flat, and are mounted as beams inside of a door to resist the external impact.

OBJECTS AND SUMMARY OF THE INVENTION

A deflection test was conducted to examine the bending strength of a prior art reinforcement member by using a member having the dimensions as shown in a FIG. 6. As shown in FIG. 7, a graph plotted with marks ◯ and X, the sample could stand the loads up to a certain level of load (ca. 160 kg) without deflection, but became deflected rapidly after reaching the standard deflection value (6 mm) to the extent that the door was folded toward the inside. Clearly, the door cannot protect passengers at this point.

The above is observed not only in the side doors of a car but in the front of a one box type car, or in the rear of a two-box type car to present similar problems.

This invention was conceived in order to eliminate these defects encountered in the prior art and aims to provide a shock absorbing member which has a cross section small enough to be assembled in a narrow space, and yet does not rapidly yield to impact loads, thereby to effectively protect passengers.

In order to attain the above purpose, shock absorbing member in accordance with the invention comprises a flat plate member which receives impact loads, another flat plate member which is provided in parallel to the first plate member with a predetermined interval therebetween, and corrugated pates which connect the two plate member and is characterized in that the corrugated plates are positioned with the ridges hereof located in the direction perpendicular to the flat plate members.

BRIEF DESCRIPTION OF THE DRAWINGS

FIG. 7 a graph to show the load deflection curves obtained from a test comparing deflection between the prior art and this invention.

DETAILED DESCRIPTION OF PREFERRED EMBODIMENTS

The invention will now be described by referring to the embodiment shown in FIGS. 1 through 4.

Figure 1:
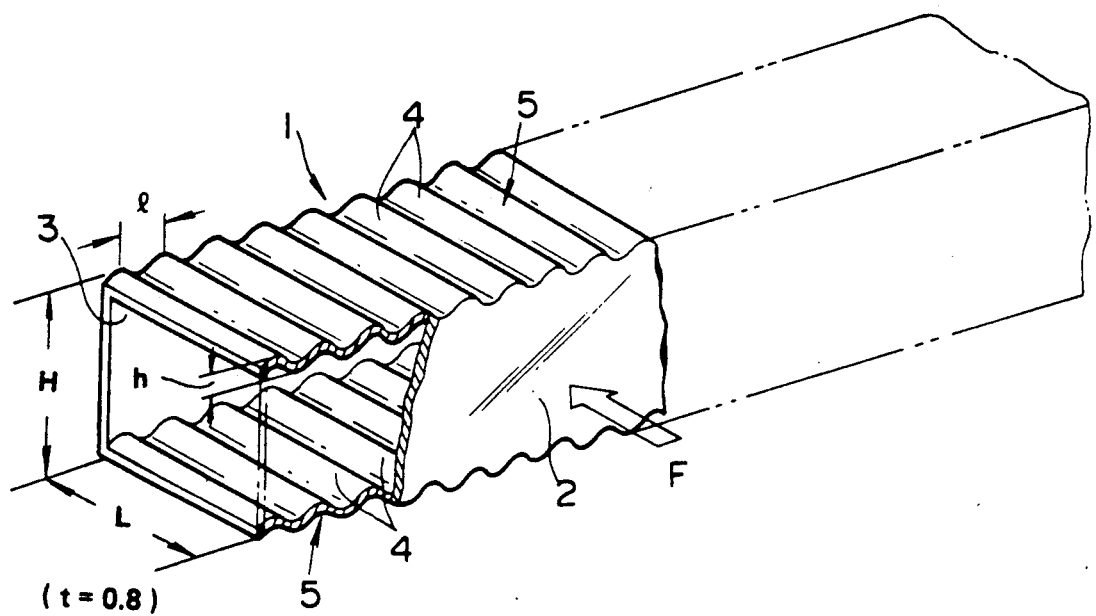
FIG. 1 is a partially cutaway perspective view to show an embodiment of the shock absorbing member according to the invention.

FIG. 1 is a perspective view of the shock absorbing member according to this invention which is partially cut away. In the figure, the member comprises a flat plate member 2 which receives loads, and another flat plate member 3 which is provided in parallel to the first flat plate member with a predetermined interval therebetween. These two flat members are connected with corrugated plates 5 which are provided with a large number of folds 4,4, .... The corrugated plates 5 are attached to the plate members 2,3 in such a manner that the ridges of the folds 4,4, ... thereon are perpendicular to the surfaces of the plate members 2,3.

FIG. 1 shows a shaped members having a box-like cross section which is formed by bulging a square pipe so as to make two opposing surfaces thereof corrugated. More specifically, a couple of bulging molds are corrugated on the bottoms thereof and attached together to form a mold. A square pipe material is inserted through the coupled molds, and fluid is forced into the pipe under high pressure to cause the same to bulge, thereby corrugate the opposing two surfaces. This process can simply make the embodiment shown in FIG. 1 having folds 4,4 ... on the two opposing surfaces.

This molding method is suitable for mass production which can produce the members at low cost.

Besides the aforementioned method, corrugated plates 5,5 may be molded separately, and then attached to flat plate members 2,3 by welding in a manner to have a box-like cross section.

The dimensions of the embodiment shown in FIG. 1 are denoted by the letters t, H, L, h, and l indicating the thickness t is 0.8 mm, the height H is 20 mm, the width L is 27 mm, the amplitude h is 3 mm and the inter-ridge interval l is 6.3 mm. Thus, as can be seen, the amplitude of the corrugations are substantially less than, and a small proportion of, the distance between the corrugated metal plates 5 (and thus the width of the flat metal plate member 2, 3), and moreover the ridges of the corrugated plates 5 have an inter-ridge interval which is substantially smaller and a small proportion of the width and spacing of the corrugated plates 5.

Figure 4:
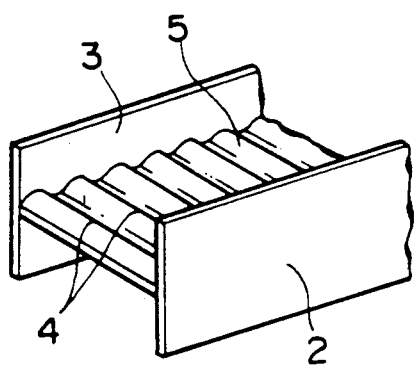
FIG. 4 a perspective view to show another embodiment of the invention.
Figure 5:
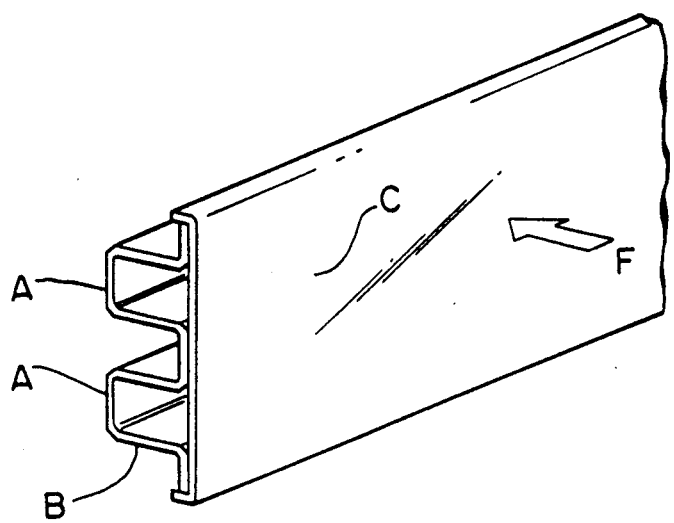
FIG. 5 a perspective view to partially show a prior art shock absorbing member.
Figure 6:
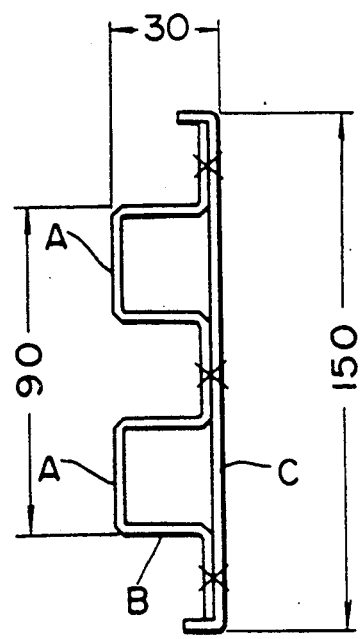
FIG. 6 a cross section thereof.

The shape of the shock absorbing member is not limited to a box, but may also be the one shown in FIG. 4 which comprises two flat plate members 2,3, and a corrugated plate 5 which is welded to the two plate members in a manner similar to the above, or to position ridges thereof perpendicular to the surfaces of the members 2,3 to have a cross section like the letter I.

Figure 2:
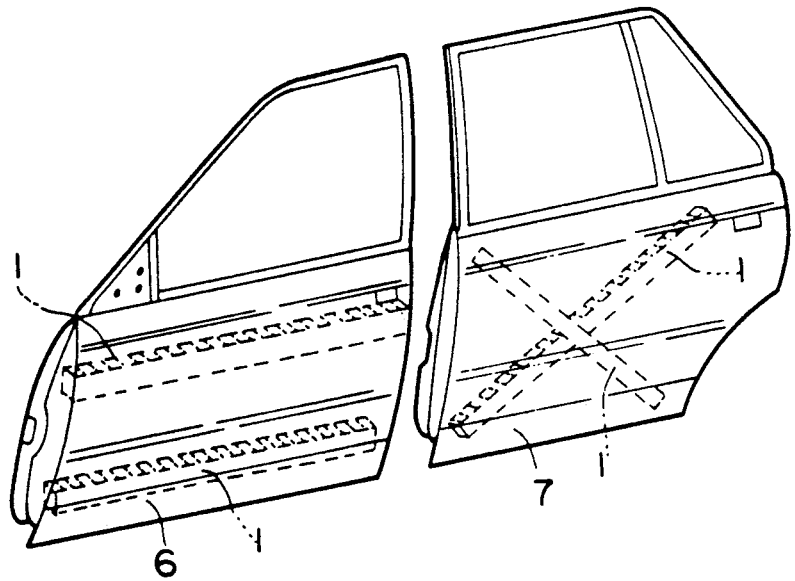
FIG. 2 a schematic view to show the shock absorbing member mounted on a car door.

The shock absorbing members 1 structured in the aforementioned manner may be provided inside the spaces of car doors 6,7 as beams in the horizontal direction as shown in the front door 6 or in a manner of a cross as shown in the rear door 7 in FIG. 2.

Figure 3:
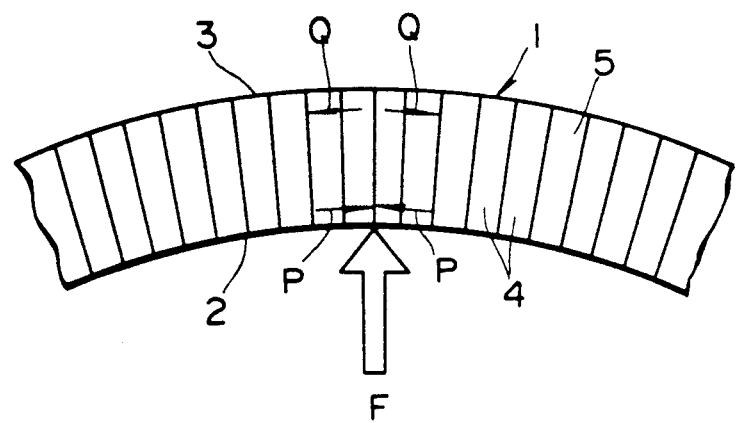
FIG. 3 an explanatory view to show the deformation on the shock absorbing member when it is subjected to a load.

The shock absorbing members 1 provided inside the door 6,7 receives the impact on the flat plate member 2 in the direction marked with F in FIGS. 1 and 3 when another car collides with the car from outside of the doors 6,7. When an impact force F is applied on the plate member 2, a compressive stress P is generated on the side of the plate member 2 while a tensile stress is generated on the plate member 3 at the other side. These forces propagate along the corrugated surface of the plate 5 to cause the plate member 2 contract in such a manner as to bring folds 4,4 . . . closer to each other and to extend the plate member 3 to separate the same from each other. The deformation on the respective folds 4,4, . . . deflects the plates in the form of a fan as shown in FIG. 3.

This can evenly distribute the stress caused by the impact at collision via the folds 4,4, . . . without concentrating it locally to thereby prevent the member from being folded twice.

The shock absorbing member shown in FIG. 1 demonstrated by a test as indicated with and Δ marks in the graph of FIG. 7 that the bearable load does not decrease even after the standard deflection value (6 mm) is reached, and deflection increases with the increase in load to thereby avoid abrupt folding.

As described in detail in the foregoing statement, the shock absorbing member for car bodies according to the invention comprises a flat plate member to receive impact loads, a flat plate member provided in parallel to the first flat plate member at a predetermined interval therefrom, and at least one corrugated member which is connected to the plate members so that the fold ridges thereof run perpendicular to the surfaces of the plates. Due to this advantageous structure, if the plate members are positioned to face the side which receives impact, the folded surfaces of the corrugated plate can evenly distribute the deflection impact when an impact load is applied thereon by deforming the corrugated plate in the form of a fan to thereby prevent the member from sharply folding itself at a location, which is often caused otherwise in the prior art.

If this member is used as a reinforcement material for a car door, it can effectively protect passengers from the shock of a collision.

As this shock absorbing member can be simply molded by a bulging process, it can be manufactured in mass production at low cost.

The application of this invention shock absorbing member is naturally not limited to door reinforcements, but may be applied in other fields to achieve similar effects.

What is claimed is:

1. A reinforcing member for resisting an impact against a car body, comprising an integral one-piece box-like shaped member which resists the impact and which includes
   a pair of parallel opposing spaced apart corrugated metal plate portions, and
   a pair of parallel opposing spaced apart flat metal plate portions for receiving the impact, extending perpendicularly to said corrugated metal plate portions so as to join opposing edges of said corrugated metal plate portions,
   said box-like shaped member being formed without seams between the corrugated metal plate portions and the flat metal plate portions, wherein the corrugated metal plate portions have ridges extending perpendicularly to said flat metal plate portions.

2. A reinforcing member for resisting an impact against a car body, comprising an integral box-like shaped member which resists the impact and which includes
   a pair of parallel opposing spaced apart corrugated metal plate portions, and
   a pair of parallel opposing spaced apart flat metal plate portions for receiving the impact, extending perpendicularly to said corrugated metal plate portions so as to join opposing edges of said corrugated metal plate portions,
   said box-like shaped member being formed from a single one-piece square metal tube by bulging a pair of opposite sides thereof into a corrugated shape without seams between the corrugated metal plate portions and the flat metal plate portions, wherein the corrugated metal plate portions have ridges extending perpendicularly to said flat metal plate portions.

3. A reinforcing member as in claim 2, wherein the metal plate portions have a thickness of 0.8 mm, outer surfaces of the corrugated opposite sides are spaced by 20 mm, each of the sides of corrugated shape have a width of 27 mm, the corrugations of the corrugated sides have an amplitude of 3 mm, and the corrugations are spaced by an interval of 6.3 mm.

4. A reinforcing member as in claim 1, wherein said corrugated metal plate portions include corrugations which have opposite ends joining opposite edges of said flat metal plate portions.

5. A reinforcing member as in claim 1, wherein the ridges of said corrugated metal plate portions have an inter-ridge interval which is substantially less than a distance between said corrugated metal plate portions.

6. A reinforcing member as in claim 1, wherein the corrugations of said corrugated metal plate portions have an amplitude which is substantially less than a distance between said corrugated metal plate portions.

7. A reinforcing member as in claim 1, wherein the ridges of said corrugated metal plate portions have an inter-ridge interval which is substantially less than a width of said corrugated metal plate portions.

8. A reinforcing member as in claim 1, wherein the ridges of said corrugated metal plate portions have an inter-ridge interval which is a small proportion of a distance between said corrugated metal plate portions.

9. A reinforcing member as in claim 1, wherein the corrugations of said corrugated metal plate portions have an amplitude which is a small proportion of a distance between said corrugated metal plate portions.

10. A reinforcing member as in claim 1, wherein the ridges of said corrugated metal plate portions have an inter-ridge interval which is a small proportion of a width of said corrugated metal plate portions.

* * * * *

UNITED STATES PATENT AND TRADEMARK OFFICE
CERTIFICATE OF CORRECTION

PATENT NO. : 5,033,593
DATED : July 23, 1991
INVENTOR(S) : Kazuhito Fukazawa It is certified that error appears in the above-identified patent and that said Letters Patent is hereby corrected as shown below:

On the Title page

Item [73], the name of the assignee should read-- Mitsui & Co., Ltd., Tokyo and Tube Forming Co., Ltd., Yokohama, both of Japan--.

Signed and Sealed this

Twenty-sixth Day of January, 1993

Attest:

STEPHEN G. KUNIN

*Attesting Officer*     *Acting Commissioner of Patents and Trademarks*